US009606611B2

(12) United States Patent
Rennig

(10) Patent No.: US 9,606,611 B2
(45) Date of Patent: Mar. 28, 2017

(54) BUS MICROCONTROLLER, BUS NODE CIRCUIT AND ELECTRONIC CONTROL UNIT FOR A VEHICLE

(71) Applicant: STMicroelectronics Application GmbH, Ascheim-Dornach (DE)

(72) Inventor: Fred Rennig, Nandlstadt (DE)

(73) Assignee: STMicroelectronics Application GmbH, Ascheim-Dornach (DE)

(*) Notice: Subject to any disclaimer, the term of this patent is extended or adjusted under 35 U.S.C. 154(b) by 95 days.

(21) Appl. No.: 14/591,779

(22) Filed: Jan. 7, 2015

(65) Prior Publication Data
US 2015/0192983 A1 Jul. 9, 2015

(30) Foreign Application Priority Data

Jan. 8, 2014 (DE) .................... 10 2014 000 248

(51) Int. Cl.
*G06F 1/26* (2006.01)
*G06F 1/32* (2006.01)
*H04L 12/403* (2006.01)

(52) U.S. Cl.
CPC .......... *G06F 1/3243* (2013.01); *G06F 1/3209* (2013.01); *H04L 12/403* (2013.01); *G06F 1/3234* (2013.01); *G06F 1/3287* (2013.01); *G06F 1/3293* (2013.01); *Y02B 60/12* (2013.01); *Y02B 60/1282* (2013.01)

(58) Field of Classification Search
CPC ... Y02B 60/12; Y02B 60/1282; G06F 1/3293; G06F 1/3234; G06F 1/3287
See application file for complete search history.

(56) References Cited

U.S. PATENT DOCUMENTS

| 6,728,892 B1* | 4/2004 | Silvkoff ................. H04L 47/30 713/320 |
| 2014/0047255 A1* | 2/2014 | Sasaki ................... G06F 1/3234 713/323 |
| 2015/0019897 A1* | 1/2015 | Horihata ........... H04L 12/40039 713/324 |

FOREIGN PATENT DOCUMENTS

| DE | 10 2008 041 454 A1 | 8/2008 |
| DE | 10 2012 201 185 A1 | 1/2012 |
| WO | 2007 071589 A1 | 6/2007 |

* cited by examiner

*Primary Examiner* — Xuxing Chen
(74) *Attorney, Agent, or Firm* — Seed IP Law Group LLP

(57) ABSTRACT

A bus microcontroller includes a processor circuit having at least one unit designed for performing one or more functions due to a bus command via a communication bus, a power control circuit adapted to be coupled to a transmitter-receiver circuit for receiving bus messages via the communication bus, and a means for placing at least part of the processor circuit into a reduced-power operating mode without placing the entire processor circuit into the reduced-power operating mode. The power control circuit is designed to evaluate incoming bus messages with respect to an activation bus message containing information on activating at least part of the processor circuit, and to output a corresponding activation control signal. The bus microcontroller also includes means for activating at least a part of the processor circuit that is placed in a reduced-power operating mode, in response to output of an activation control signal of the power control circuit.

21 Claims, 3 Drawing Sheets

BUS MICROCONTROLLER, BUS NODE CIRCUIT AND ELECTRONIC CONTROL UNIT FOR A VEHICLE

BACKGROUND

Technical Field

The present disclosure relates to a bus microcontroller and a bus node circuit comprising a bus microcontroller. Such a bus microcontroller and bus node circuit are used in particular for coupling to a communication bus for a vehicle for realizing so-called "partial networking". This is for example a CAN bus microcontroller that is adapted to be coupled to a CAN communication bus. The disclosure moreover relates to an electronic control unit ("ECU") for a vehicle comprising a bus microcontroller and a bus node circuit, respectively.

Description of the Related Art

A communication bus, such as, e.g., in a vehicle, is typically coupled to a plurality of electronic control units (ECUs) performing various functions and constituting a respective bus node. For example, there is provided an ECU for door control and/or an ECU for trunk control, by means of which closing and opening, respectively, of the doors and the trunk respectively, can be controlled and monitored. Such ECUs, in terms of the function thereof, can be subdivided into groups and can be allocated to different functional groups (so-called "domains"). For example, there is a "body domain" related to functions for user convenience, a "chassis domain" related to user safety, and an "infotainment domain" related to information and entertainment, etc. Each of these domains may have a communication bus of its own, for example in the form of a controller area network (CAN) bus, to which the ECUs of the corresponding modules to be controlled are connected as bus participants. Each such ECU to this end comprises a bus node circuit via which a bus microcontroller of the ECU is coupled to the bus and adapted to communicate with a central bus control module (e.g., a so-called "body control module" (BCM) for the body domain) which controls and monitors data traffic on the communication bus. In accordance with a further example, bus communication can also take place in a decentralized fashion without a central bus control unit.

A bus microcontroller of an ECU, such as of a door controller, receives a bus message, e.g., via the communication bus to the effect that a window of the door is to be opened. The bus microcontroller then performs a so-called task (i.e., a process), addressing a corresponding circuit for opening the windows. A frequently used communication bus for such purposes is the known CAN communication bus.

An increasing trend in modern vehicles is that the number of functional units, and thus the number of ECUs, increases with increasing number of convenience and safety functions in the vehicle. A problem associated therewith, however, consists in that, with an increasing number of ECUs in the vehicle, the energy consumption for operating the ECUs increases as well. These are not only operated with electrical energy when the function is active, but also during other times while they are passive and do not drive a functional circuit for performing a specific function, such as opening the windows. This causes the energy consumption of the vehicle and the $CO_2$ emission of the same to rise.

There are technologies in existence at present which permit the energy consumption of ECUs to be reduced in the so-called "standby mode" in which no function is performed. Such a technology is known for example as so-called "partial networking" in which a bus participant, such as a bus microcontroller of an ECU, is switched into an active or inactive state, respectively, for a certain period of time. In general, "partial networking" describes the function of activating a specific part of a network at a specific point of time. For example, the protocol of the CAN bus (CAN stands for control area network) supports "partial networking" for vehicle components that are connected to the CAN bus. In this regard, e.g., the bus microcontroller recognizes a state in which it can switch to an inactive state, e.g., when the vehicle is parked and a window is not to be opened for a longer period of time. For example, the BCM of the vehicle transmits a corresponding message on the communication bus, which is recognized by the ECU and the bus microcontroller of the door controller, respectively, and the bus microcontroller as a result is switched to the inactive state. However, when a bus message is addressed to an ECU, it has to be served by the corresponding bus microcontroller of the ECU. For example, it is necessary to operate and initialize internal memories to this effect. This may prevent the bus controller from entering a standby mode.

An approach of "partial networking," e.g., provides that the bus microcontroller of an ECU controls a voltage supply circuit which then deactivates the supply voltage of the bus microcontroller. The result of this is that the bus microcontroller consumes no electrical energy in this state. If the transmitter-receiver circuit (so-called "transceiver") of the ECU receives a message on the bus and recognizes that the bus controller is to be activated (in particular by a so-called "wake-up" message having a specific pattern and defining a so-called "wake-up event" and consequently a specific activation action), the transceiver controls the voltage supply circuit whereupon the latter reactivates the supply voltage of the bus microcontroller. This may also include the supply voltage of additional components of the ECU.

An aspect to be considered in this regard is that the bus microcontroller, upon activation of the supply voltage, needs a relatively long period of time to get started and to load all necessary software routines in the internal memories (i.e., so-called booting process). Such a booting process has a duration, e.g., in the order of 100 ms. However, this prevents the bus microcontroller from turning off also during times in which it is actually inactive, but is still logged on or registered to the central bus control module (BCM) as active bus participant (e.g., at times when no window opening operation is performed during vehicle travel). For, with the occurrence of an event, such as operation of the power window, the reaction period from booting of the microcontroller to opening of the window would be too long.

It would also be conceivable in such "inactive" periods of time to utilize the bus microcontroller in such times, in which it does not participate in bus traffic, for other functions, e.g., for contact monitoring of switch contacts, such as the switches for the power windows. Such contact monitoring could take place approximately in time intervals of 50 ms. Due to the long booting duration of the bus microcontroller, however, it is not possible to boot the microcontroller each time for an individual contact monitoring operation, as this period of time would be considerably longer than the monitoring interval. This has the effect that the bus microcontroller, for such contact monitoring, has to remain in the active state so that the energy consumption cannot be lowered for such application either.

It would be desirable to make available a bus microcontroller and a bus node circuit for a communication bus comprising a bus microcontroller which, in connection with the "partial networking" functionality of a bus network, permits a further reduced energy consumption to be achieved.

BRIEF SUMMARY

An aspect of the disclosure relates to a bus microcontroller according to claim 1. An additional aspect of the disclosure relates to a bus node circuit for a communication bus according to claim 12. A still further aspect of the disclosure relates to an electronic control unit for a vehicle comprising a bus microcontroller according to the disclosure or a bus node circuit according to the disclosure for connection to a vehicle communication bus.

According to an aspect of the disclosure, there is described a bus microcontroller, in particular for coupling to a vehicle communication bus, comprising: a processor circuit having at least one unit to perform one or more functions due to a bus command via a communication bus, a power control circuit adapted to be coupled to a transmitter-receiver circuit for receiving bus messages via the communication bus, and means for placing at least part of the processor circuit into a reduced-power or power-down mode of operation, without placing the entire processor circuit into the reduced-power operating mode. The power control circuit evaluates incoming bus messages with respect to an activation bus message containing information on activating at least part of the processor circuit, and to output a corresponding activation control signal. Furthermore, there are provided means for activating at least a part of the processor circuit that is placed in a reduced-power operating mode, in response to output of an activation control signal of the power control circuit.

According to another aspect of the disclosure, there is made available a bus node circuit for a communication bus, in particular of a vehicle, comprising the following components: a bus microcontroller comprising a processor circuit that has at least one unit adapted to perform one or more functions due to a bus command via a communication bus, a transmitter-receiver circuit for receiving bus messages, which is adapted to be coupled to the communication bus via a bus node, and means for placing at least part of the processor circuit into a reduced-power operating mode, without placing the entire processor circuit into the reduced-power operating mode. The power control circuit evaluates incoming bus messages with respect to an activation bus message containing information on activating at least a part of the processor circuit, and to output a corresponding activation control signal. Moreover, there are provided means for activating at least a part of the processor circuit that is placed in a reduced-power operating mode, in response to output of an activation control signal of the power control circuit.

The power control circuit (also referred to as "partial networking module" herein), the means for placing at least part of the processor circuit into a reduced-power operating mode and/or the means for activating at least part of the processor circuit may be provided in the bus microcontroller, in the transmitter-receiver circuit or on the chip of the bus microcontroller or of the transmitter-receiver circuit, or may also be distributed among these components.

In a method of operating the bus microcontroller and the bus node circuit, respectively, the means for placing at least part of the processor circuit into a reduced-power operating mode place or switch one or more parts of the processor circuit into a reduced-power operating mode, without placing the entire processor circuit into the reduced-power operating mode. The transmitter-receiver circuit receives at least one bus message via the communication bus and passes the same on the power control circuit. The power control circuit evaluates incoming bus messages with respect to an activation bus message containing information on activating at least part of the processor circuit, and outputs a corresponding activation control signal. In response to the output of an activation control signal of the power control signal, the means for activating at least part of the processor circuit activate one or more parts of the processor circuit which before were placed into a reduced-power operating mode. For example, the activation bus message may contain information on which part or parts of the processor circuit are to be activated from the reduced-power operating mode.

In particular, the part or those parts of the processor circuit that are placed into a reduced-power operating mode, are still operated in the reduced-power operating mode with an operating voltage provided by a voltage generator (in particular a positive operating voltage that is applied, e.g., also during normal operation).

The bus microcontroller for example is a CAN bus microcontroller.

The power control circuit for example is included in the transmitter-receiver circuit (also referred to as "transceiver") or in the bus microcontroller.

In accordance with an embodiment, the means for placing at least part of the processor circuit into a reduced-power operating mode compromise a determination means that is adapted to determine which parts of the processor circuit are placed into the reduced-power operating mode.

In accordance with an embodiment, the means for placing at least part of the processor circuit into a reduced-power operating mode are arranged such that at least a second part of the processor circuit performs a task (i.e., process), while at least a first part of the processor circuit is placed into a reduced-power operating mode.

The second part of the processor circuit for example performs a task, with a processor core of the processor circuit being in the reduced-power operating mode and not participating in performing the task.

In accordance with an embodiment, the power control circuit analyzes bus messages without participation of the processor circuit.

BRIEF DESCRIPTION OF THE SEVERAL VIEWS OF THE DRAWINGS

Embodiments of the disclosure will be elucidated in more detail in the following by way of the drawings, wherein.

DETAILED DESCRIPTION

Figure 1:
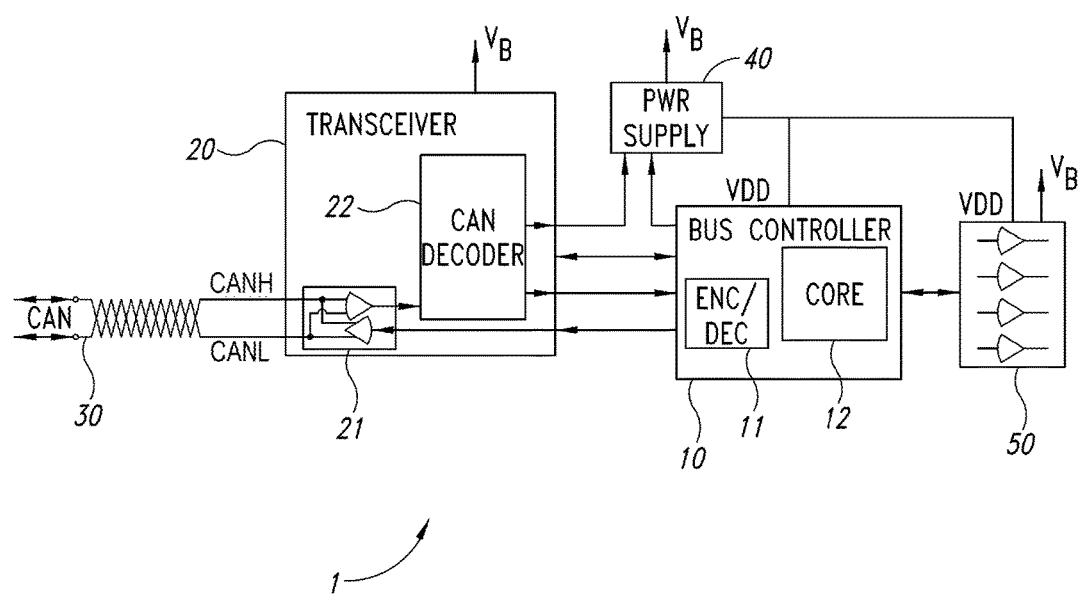
FIG. 1 shows an example of an ECU comprising a bus microcontroller, a transmitter-receiver circuit containing a "partial networking" functionality, as well as a supply voltage generator, with the ECU being coupled to a CAN bus of a vehicle.

FIG. 1 shows an example of an electronic control unit (ECU) that is used for example in a vehicle communication bus. In the instant case, the ECU is coupled to a CAN bus which in the vehicle sector is a commonly used communication bus. The CAN (Control Area Network) bus as an example of a communication bus used herein is a vehicle communication bus standard arranged to permit microcontrollers that can be coupled to the bus (referred to as bus microcontrollers herein) to communicate with each other in a vehicle in standardized manner. The bus microcontrollers typically communicate with each other by exchanging sensor data, actuator data, actuator commands and/or application data. A bus microcontroller, together with a transmitter-receiver circuit via which the bus microcontroller can be coupled to the bus, constitutes a bus node circuit which in the bus network constitutes a bus node. The bus node circuit optionally comprises further components, such as a supply voltage generator. Such a bus node circuit is contained, e.g., in an ECU which thus constitutes a bus node.

The CAN communication bus protocol is standardized in the standard ISO 11898-1 to ISO 11898-6, with ISO 11898-6 specifying the technology known so far as "partial networking". The term "partial networking" often is not used anymore in official documents, in particular in ISO standard 11898-6 entitled: "High-speed medium access unit with selective wake-up functionality". This is why "partial networking" often is referred to also as "selective wake-up", in particular in official technical literature, although "partial networking" frequently is known better and the expert knows what is meant thereby.

The software implemented on the bus microcontroller is implemented in particular in accordance with AUTOSAR in the scope of the "AUTOSAR Communication Service". There are pertinent specifications available in this regard and sufficiently known to the expert, so that there is no need to discuss technical details concerning this technology in more detail in the present document.

However, the disclosure may also be utilized in connection with other communication bus standards (hardware and/or software).

Typically, a bus microcontroller can be coupled to the bus via a transmitter-receiver circuit (so-called "transceiver"). The transceiver typically is arranged as a separate component beside the bus microcontroller, as shown in FIG. 1. However, an integrated implementation is possible as well. The bus microcontroller constitutes the core processing or core computing unit of the bus node circuit and thus is the central computing unit for performing bus applications and functions due to a bus command, which are to be performed by the bus microcontroller and the bus node circuit, respectively (i.e., in the instant case the ECU), in cooperation with a sensor circuit and/or an actuator circuit on the basis of one or more bus commands. A bus application or function due to a bus command, for example, is the opening of a vehicle door due to operation of a key switch by the user and the outputting of a corresponding bus command of the BCM to the ECU of the door controller caused thereby.

For sending a transmission message, the bus microcontroller sends the transmission message to a provided CAN decoder, which encodes the message and sends the bit sequence to the CAN bus via the transceiver. Upon receipt, transmission messages are correspondingly decoded by the CAN decoder. The transceiver matches the signal levels of the bus messages to the signal levels that can be processed by the CAN decoder and the bus microcontroller.

In the present example according to FIG. 1, which in known per se manner is already in use, the ECU 1 comprises a bus microcontroller 10 and a transmitter-receiver circuit (transceiver) 20. The transceiver 20 includes a logic transmitter-receiver unit 21 for the CAN bus messages and a CAN decoder 22 that also implements the "partial networking" functionality. The transceiver 20 is connected to a CAN bus 30. The microcontroller 10 comprises a processor core 12 and a CAN frame encoder and decoder circuit 11. These components of ECU 1 have a battery voltage $V_B$ applied thereto. The voltage supply of the bus microcontroller 10 is effected via a voltage supply circuit (voltage generator) 40. An actuator circuit or a sensor circuit, such as one or more switches for door opening, can be controlled via a driver circuit 50.

As already described hereinbefore, the technology known as "partial networking" permits a reduction of the energy consumption of ECUs in a standby mode in which no bus function is performed. To this end, for example in a case in which the bus node circuit of ECU 1 is not required, the entire bus node circuit, except for transceiver 20, is deactivated. In particular, the bus microcontroller 10 of ECU 1 is cause to be inactive for a specific period of time. The bus microcontroller 10 for example recognizes a state in which it can switch to an inactive state, e.g., when a bus message is transmitted via the CAN bus 13 from the BCM of the vehicle (not shown), which signals to the bus microcontroller 10 that it may switch to the inactive state.

An already utilized approach of "partial networking," e.g., provides that the bus microcontroller 10 addresses the voltage supply circuit 40 which then deactivates the supply voltage VDD of the bus microcontroller 10. The consequence hereof is that the bus microcontroller 10 consumes no electrical energy in this state. When the transceiver 20 of ECU 1 receives a message on bus 30 and recognizes that bus microcontroller 10 is to be activated (so-called "wake-up" message having a specific bit pattern), the CAN decoder 22 of the transceiver 20 addresses the voltage supply circuit 40, whereupon the latter reactivates the supply voltage VDD of bus microcontroller 10. An aspect to be considered in this regard is that the bus microcontroller 10, upon activation of the supply voltage VDD, needs a relatively long period of time for performing the booting process, for example for loading all required software routines into the internal memories and for booting the internal voltage generators in the individual parts of the bus microcontroller.

Figure 2:
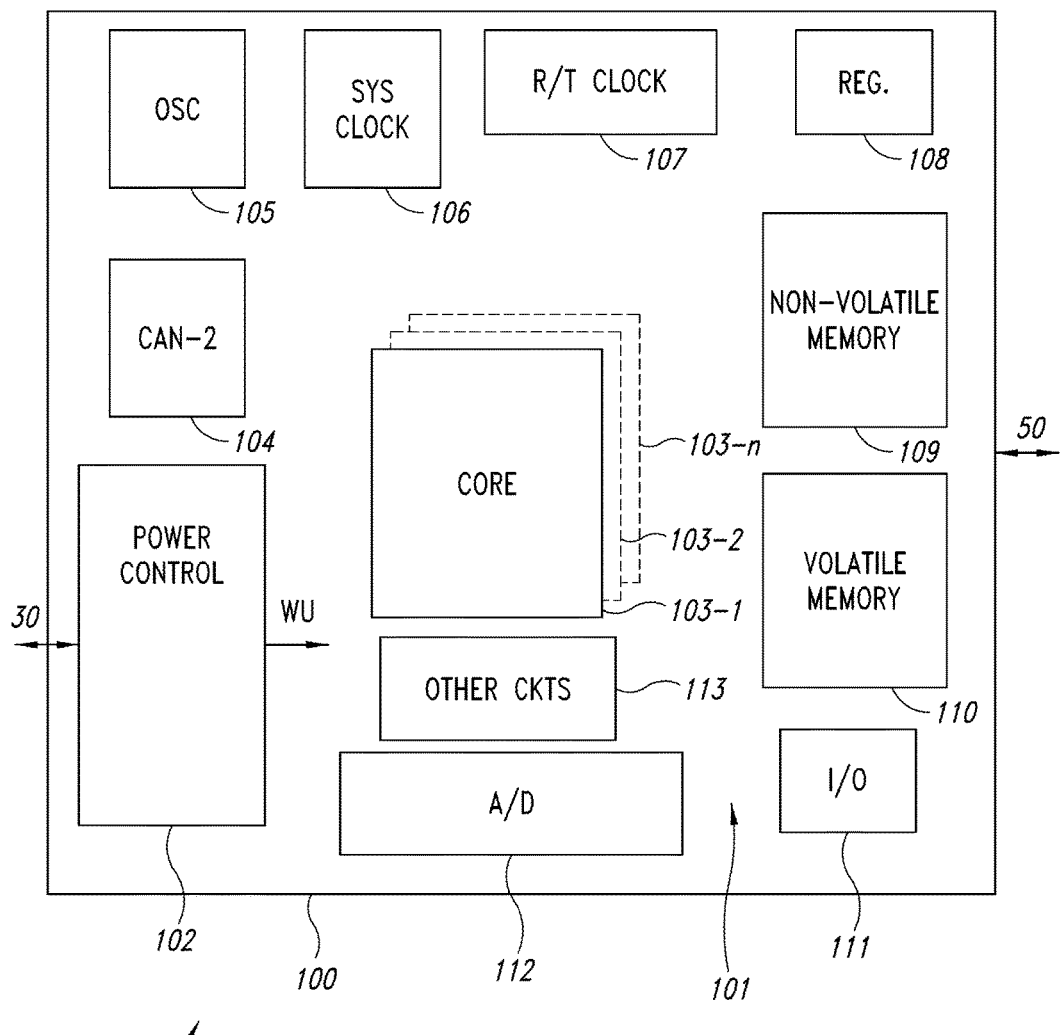
FIG. 2 shows an embodiment of a bus microcontroller in accordance with an aspect of the disclosure.

FIG. 2 shows an embodiment of a bus microcontroller in accordance with an aspect of the disclosure, which may be included in an electronic control unit (ECU) 2. The bus microcontroller 100 in the present embodiment can be coupled to a CAN bus 30 on the one hand and a driver circuit 50 according to FIG. 1 on the other hand. Differently from the bus microcontroller 10 according to FIG. 1, the bus microcontroller 100 according to FIG. 2 comprises a power control circuit 102 (so-called "partial networking module") which, for receiving bus messages via a transmitter-receiver circuit (such as a transceiver or the logic transmitter-receiver unit 21 according to FIG. 1), not shown in FIG. 2, can be coupled to a communication bus (such as CAN bus 30 according to FIG. 1). In addition, the bus microcontroller 100 comprises a processor circuit 101 having at least one unit (in the instant case several units 102 to 113), with at least one of the units (here in particular units 103-1 to 103-n) being arranged to perform one or several functions in response to a bus command via bus 30. The bus command or commands for performing one or several functions are sent to the bus microcontroller 100, e.g., from a BCM of a vehicle.

In particular, the processor circuit 101 in the present embodiment comprises one or more processor cores 103-1 to 103-n which each alone or in combination with each other perform one or more functions or applications due to one or more bus commands. For example, the processor core (referred to in general as "core") 103-1 carries out an application for opening the doors or a window of a door when a corresponding bus message is transmitted from the BCM of the vehicle to the ECU 2 comprising the bus microcontroller 100. It is advantageous therefor that the processor core 103-1 accesses a volatile memory, e.g., RAM 110 ("random access memory") or a non-volatile memory, e.g., flash memory 109, having corresponding data stored therein. It is advantageous for such access that memories 109 and 110, respectively, have a supply voltage applied thereto and need not be booted first.

In addition thereto, the following units or circuit components are provided in processor circuit 101 in exemplary manner: a CAN2 circuit 104, a quartz oscillator 105, an frequency modulating phase locked loop (FMPLL) system clock circuit 106, a real-time clock circuit 107, a voltage regulator 108, and input/output system (so-called I/O system) 111, e.g., an eMIOS system, an analog-to-digital converter 112 and optionally other circuit components 113.

In addition thereto, there are provided means for placing at least part of the processor circuit 101 into a reduced-power operating mode (also referred to as standby mode hereinafter). These means are implemented for example by one or more of the units 102 to 113, such as by one of the processor cores 103-1 to 103-n. These means place at least one of the parts or units 103 to 113 of the processor circuit 101 into a reduced-power operating mode, without placing the complete processor circuit 101 into the reduced-power operating mode (e.g., by deactivating the supply voltage VDD of the bus microcontroller, such as bus microcontroller 10 of FIG. 1). In particular, these means place at least one of the parts or units 103 to 113 of the processor circuit 101 into a reduced-power operating mode without deactivating the processor circuit 101 in total. For example, processor core 103-1 is switched to a standby mode in which a supply voltage is still fed to the same, while however it does not perform (high-power) computing operations. The advantage hereof is that the processor circuit 101 need not be booted first in a booting process, once it was deactivated, in particular when the supply voltage thereof was deactivated. It is also possible to completely deactivate the supply voltage for individual parts of the bus microcontroller and/or the ECU. These parts may also be reactivated upon arrival of a wake up frame (WUF) message (i.e., an activation bus message) provided that there is sufficient time available then for booting. After all, it is not necessary any more to react on each bus message within a short time.

In the scope of the "partial networking" function, the power control circuit 102 evaluates incoming bus messages with respect to an activation bus message containing information on activating at least part of the processor circuit 101, and to output a corresponding activation control signal WU. The at least one part of the processor circuit to be activated is in a reduced-power operating mode when receiving the activation bus message. The term reduced-power can also mean unpowered. In such a case, power reduction can be effected by deactivation of the voltage supply. In response to the output of an activation control signal WU of the power control circuit 102, means provided activate at least part of the processor circuit 101 which before was placed in a reduced-power operating mode. These means for activation may be implemented for example by the power control circuit 102 and/or one of the processor cores. For example, the activation control signal WU signals to the processor core 103-1 that the reduced-power operating mode is to be terminated. This can be accomplished within a relatively short period of time, as compared with a period of time necessary for a booting process of the processor core. These means in turn can be implemented by one of the units 102 to 113. Parts of the processor circuit may be unpowered, whereas other parts are powered, e.g., in the reduced-power operating mode only (e.g., with reduced voltage). An activation bus message (WUF) can wake up the same again hereinafter—depending on the time available.

In accordance with an embodiment, the means for placing at least part of the processor circuit into a reduced-power operating mode comprise a determination means that is adapted to determine which parts of the processor circuit are placed in the reduced-power operating mode. These means may be, e.g., the power control unit 102 or one of processor cores 103-1 to 103-n.

Preferably, the means for placing at least a first part or unit of the processor circuit 101 into a reduced-power operating mode are arranged such that at least a second part or unit of the processor circuit 101 or a circuit coupled to the processor circuit 101 performs a task while at least a first part or unit of the processor circuit 101 is placed into a reduced-power operating mode (a task is a process of the respective unit or circuit for performing the intended function). For example, one or more of the units 103 to 113 or also a circuit coupled to the bus microcontroller can remain activated, e.g., a timer circuit (time control circuit), e.g., for performing cyclic contact monitoring of a connected driver circuit (such as driver circuit 50 according to FIG. 1). Such activated units or circuits are capable of performing the respective function autonomously in the reduced-power operating mode. Such contact monitoring can be carried out, e.g., by a (small) processor unit using corresponding software (software driver circuit). For example, it is possible to check in intervals of about 50 ms whether contacts of a door (such as a power window switch) were operated by a user (so-called "contact monitoring"). This necessitates comparatively little electrical energy, and moreover it is possible to switch other components of the processor circuit 101 that are not necessary for this into a reduced-power operating mode, or to deactivate the same. The bus microcontroller can decide which parts of the processor circuit or which circuits coupled to the processor circuit remain activated in the reduced-power operating mode.

In particular, the bus microcontroller and, respectively, the means thereof for placing at least part of the processor circuit into a reduced-power operating mode can be configured such that a specific part of the processor circuit (e.g., a timer circuit for contact monitoring) performs a task while one or more of the processor cores of the processor circuit are in the reduced-power operating mode and do not participate in performing the task. For example, it is possible that all processor cores provided are in the reduced-power operating mode.

In accordance with an embodiment, such part of the processor circuit 101 performs a task that is adapted to cyclically monitor user-operated switch contacts of a circuit connected to the bus microcontroller 100, i.e., switch contacts that can be operated by a user.

With respect to the bus communication via bus 30, the bus microcontroller 100 preferably is arranged such that, in the reduced-power operating mode with respect to the bus control module (such as the BCM of a vehicle) from which it receives bus messages, it is designated or identified as an inactive bus participant (logging off according to AUTO-STAR partial networking specification may basically also take place differently). This has the effect that the bus microcontroller 100 is no longer expected to issue a feedback and that it thus no longer has to deal with network traffic. It is thus possible that one or more of the processor cores 103-1 to 103-n enter a reduced-power operating mode, as monitoring of the network traffic of the bus 30 is not necessary any more. This state ends when a corresponding activation bus message ("wake-up frame") has been recognized by the power control circuit 102.

Figure 3:
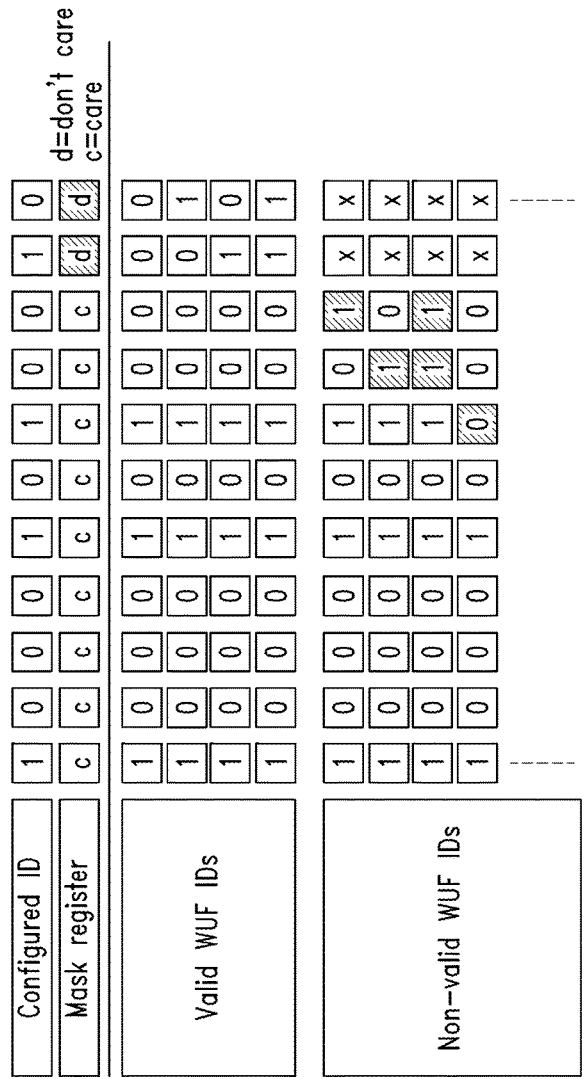
FIG. 3 shows an example of an activation bus message in the form of a "wake-up frame (WUF)" for evaluation by the power control circuit.
Figure 3:
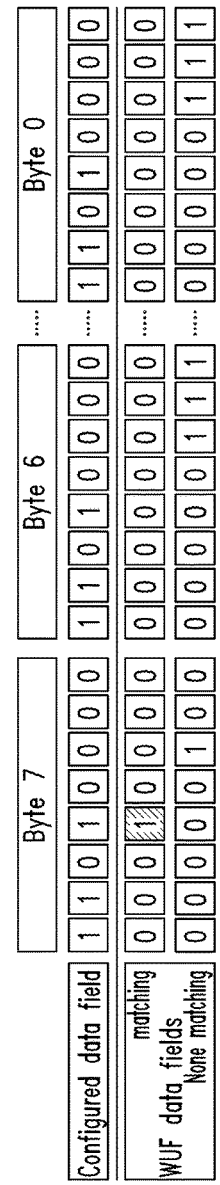

FIG. 3 illustrates examples of an activation bus message in the form of a "wake-up frame (WUF)" in accordance with standard ISO 11898-6. An activation bus message will also be referred to as WUF message in the following. A "standard wake-up frame", i.e., an activation bus message according to standard ISO 11898-6, is used to transmit substantially two parts, namely firstly an addressing part (upper part in FIG. 3 with 11 bits of "configured ID") which serves for addressing a bus node (or an ECU or a bus microcontroller), followed by a data part that may comprise up to 8 bytes (referred to as "data bytes" in the following) (lower part of FIG. 3 with "byte 0" to "byte 7").

"Configured ID" designates an identification bit sequence for identifying an activation bus message for evaluation by the power control circuit 102. This is shown in "Valid WUF IDs" indicating valid WUF identifications. In this regard, the last two bits are not of relevance (thus four possible valid WUF identifications) as these were masked in accordance with the last two bits "d" in the "Mask register". "c" has the meaning that the corresponding bits are of relevance ("care") with respect to the identification of a WUF message, whereas the "d" bits are of no relevance therefor ("don't care"). The "Non-valid WUF IDs" designate the non-valid WUF identifications.

For example, there is an identification bit sequence deposited in a bus microcontroller, namely the "Configured ID". As soon as a bus message transmitted contains a bit sequence which at the locations "c" of the mask register corresponds to the bit sequence of the "Configured ID" deposited in a bus microcontroller, the corresponding bus microcontroller is addressed.

WUF identification can also take place via the bits in the data bytes of an activation bus message (WUF message). For example, a bit sequence may be deposited in the respective bus microcontroller (or bus node or ECU) to this end as well (cf. "Configured data field"), with respect to which bit sequence the incoming data bytes are evaluated. It is possible to evaluate, e.g., 8 data bytes, or also more or less data bytes. For example, when in a WUF message the data bytes transmitted ("WUF data fields") have a bit sequence which shows matching with the "Configured data field" in at least one bit location, matching (cf. e.g., fourth bit from the left of a data byte in byte 7 illustrated) is ascertained. Otherwise, non-matching ("none matching") is ascertained. For example, in case matching is ascertained, a specific activation action is performed. It is thus possible to identify with the data bytes a "wake-up" situation (activation) for a specific bus microcontroller, bus node or ECU and/or to determine the kind of a "wake up", e.g., which circuit of the bus microcontroller concerned or which connected circuit is to be activated due to the "wake-up". The data bytes can be used as messages for selective wake up. The data bytes thus can be utilized as kind of extended wake-up mechanism and can be evaluated by the power control circuit 102. To this end, there can be used 8 bytes or also more or less bytes. In particular, it could also be possible to use more than 8 bytes, which is already implemented, e.g., in the so-called new "CAN-FD" (enhanced CAN protocol) (using up to 64 bytes).

The power control circuit 102 preferably analyzes bus messages transmitted via bus 30, without participation of the processor circuit 101.

A bus microcontroller partitioning in the scope of a reduced-power operating mode (standby mode) according to the disclosure could be configured as follows:

During the standby mode with "partial networking" functionality, there are active: power control circuit 102, voltage regulator 108. The remaining components 103 to 113 can be optionally active, but can also be shut down (so-called "powered down"), and can enter, e.g., a mode with reduced clock rate and/or be turned off. The unit referred to as "other circuit component 113" in FIG. 2 in exemplary manner is to comprise additional parts, units and modules, respectively, of the processor circuit 101, which can be provided in accordance with the field and kind of application of the bus microcontroller 110. These may be active or inactive in the standby mode, depending on the particular field of application and function to be performed. "Active" in this context is supposed to mean that the respective parts, units and modules 103 to 113 of the processor circuit 101 are operated in the same manner as during normal operation, in which the bus microcontroller 100 operates the respective parts, units and modules 103 to 113, respectively, of the processor circuit 101 as active network participants.

By switching one or more parts of the processor circuit into a reduced-power operating mode as required, the disclosure applies microcontroller degradation in combination with the partial networking functionality in order to make available a bus microcontroller and a bus node circuit for a communication bus comprising a bus microcontroller, respectively, that permit further reduced energy consumption. It is rendered possible at the same time that specific parts of the bus microcontroller, in a state of the bus microcontroller as active or inactive network participant, perform secondary tasks, such as cyclic contact monitoring, and in between the same return to the reduced-power operating mode in order to save energy. It is possible in this respect that only specific parts of the processor circuit operate in this manner, without the entire processor circuit being activated therefor or without operating the processor core with the full supply voltage.

Other functions that can be performed in addition or as an alternative in a reduced-power operating mode of the bus microcontroller may be: turning illumination on and off, respectively, window opening or closing, seat control, airbag control, windscreen wiper control or trunk control.

In accordance with an embodiment, the bus microcontroller can be caused to enter, from the reduced-power operating mode, a plurality of different activation modes that are triggered by different activation bus messages (WUF messages). For example, WUF messages have several bit sequences (e.g., 8 bytes) that can be evaluated in this regard. It is thus possible, for example, to activate different components of the processor circuit 101. The power control circuit is arranged to evaluate incoming bus messages with respect to one of the activation bus messages and to output a corresponding activation control signal. A specific bit sequence of a WUF message can thus determine a specific wake-up event. It is possible, for example, to store CAN data of the WUF message and to evaluate the contents by software. In addition, several wake-up events can be triggered simultaneously.

For example, the following activation actions ("wake-up events") can be implemented in the power control circuit individually or in combination with each other (which can be configured, e.g., by software): Activation ("wake-up") of the processor circuit from the reduced-power operating mode (standby mode) into the normal operating mode (main activation action); transmitting a specific interrupt to the processor core; defining so-called "power supply domains" (supply voltage domains); activation ("wake-up") of individual processor cores; triggering of timing modules (time control modules), such as, e.g., in contact monitoring described hereinbefore; increasing a processor core frequency; starting a timer of the processor circuit; triggering an analog-to-digital converter with predetermined interrupt events; activation of individual peripheral circuits (such as a coupled sensor circuit or actuator circuit); and/or activation of a flash memory.

According to an embodiment, the bus microcontroller, in the reduced-power operating mode, is arranged to identify itself towards a bus control module (such as the BCM of a vehicle) from which it receives bus messages, as an inactive bus participant, while it has at the same time full functionality and has an operating voltage applied thereto which is also applied outside the reduced-power operating mode, in normal operation of the bus microcontroller. It is thus possible that the bus microcontroller, in case of a corresponding WUF message, performs the desired function relatively rapidly, without a time-consuming booting process. The identification as inactive bus participant at the same time permits that the bus microcontroller need not bother about the network traffic of the bus and can thus place a processor core required therefor into the reduced-power operating mode.

In accordance with an embodiment, the means for placing at least part of the processor circuit into a reduced-power operating mode are configured to place at least a part of the processor circuit into the reduced-power operating mode which, in normal operation of the bus microcontroller, performs a task in which it is necessary that the bus microcontroller, towards a bus control module from which it receives messages, is registered or designated as active bus participant.

The power control circuit 102 may be contained in the bus microcontroller 100, as illustrated in FIG. 3. The advantage hereof is that the bus microcontroller can be employed universally and autonomously. However, it is also possible that the power control circuit 102 is included in the transmitter-receiver circuit (such as transceiver 20 according to FIG. 1) that is coupled to the bus microcontroller. The transceiver and the bus microcontroller usually are provided on different chips that are also powered by different supply voltages. The other aspects of the disclosure described herein are equally applicable to both embodiments.

Moreover, the means for placing at least part of the processor circuit into a reduced-power operating mode and the means for activating at least part of the processor circuit may also be provided in the bus microcontroller and/or in the transmitter-receiver circuit.

It is provided according to an embodiment that the transmitter-receiver circuit (transceiver) has a so-called "handshake" procedure implemented therein as it is known to the expert in connection with "enhanced voltage biasing" of ISO 11898-6 for matching the voltage levels on the part of the transmitter-receiver circuit to the voltage levels of the bus microcontroller (so that full conformity with standard ISO 11898-6 is established).

A power control circuit according to the disclosure may also comprise a bus message error detection (so-called "frame error detection") according to standard ISO 11898-6. Frame error detection is a constituent part of ISO 11898-6. A preferred aim consists in complete implementation of the standard inclusive of additional functionality. The "frame error detection" mentioned herein is an example.

It is also possible to provide in the bus microcontroller and in the bus node circuit, respectively, a plurality of power control circuits, for example when several buses are coupled to the bus microcontroller and the bus node circuit, respectively. It is useful here to provide one power control circuit for each bus network connected. The power control circuits thus provided may be operated via a common oscillator.

A reduced-power operating mode in connection with the disclosure was also referred to as a standby mode herein. As applied to "partial networking" according to ISO 11898-6, however, there are various reduced-power operating modes, such as "standby" ("STBY"), "halt" and "stop" mode. There are possible additional reduced-power operating modes up to deactivation or turning-off of a part, unit or circuit. A reduced-power operating mode in the context with the present disclosure basically may be any of these reduced-power operating modes.

The bus microcontroller according to the disclosure described herein and the bus node circuit according to the disclosure described herein, respectively, can be employed in an electronic control unit (commonly referred to as "ECU") for a vehicle and to this end may be connected to a vehicle communication bus, in particular a CAN bus. The bus microcontroller and the bus node circuit, respectively, then constitutes a participant of a bus network (e.g., a CAN network) of the vehicle. The bus microcontroller and the bus node circuit, respectively, can enter a reduced-power operating mode (standby mode) while the bus network is active, e.g., for controlling other ECUs of the bus network.

The disclosure, in addition to the automotive field, can also be used in industry. It may also be applied to other kinds of communication buses and the protocols thereof, such as, e.g., the FlexRay bus or the LIN bus (Local Interconnect Network).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A bus microcontroller, comprising:
a processor circuit having at least one unit to perform one or more functions directed by a bus command received via a communication bus;
a power control circuit coupleable to a transmitter-receiver circuit, the transmitter-receiver circuit configured to receive bus messages via the communication bus;
means for placing at least part of the processor circuit into a reduced-power operating mode without placing the entire processor circuit into the reduced-power operating mode, said power control circuit configured to evaluate incoming bus messages, said power control circuit configured to determine if an activation bus message contains information to activate the at least part of the processor circuit, and said power control circuit configured to output an activation control signal corresponding to the information to activate the at least part of the processor circuit; and means for activating the at least part of the processor circuit from the reduced-power operating mode in response to output of the activation control signal of the power control circuit, wherein the bus microcontroller is configured, when the at least part of the processor circuit is in the reduced-power operating mode, to identify itself as an inactive bus participant towards a bus control module from which the transmitter-receiver circuit receives bus messages.

2. The bus microcontroller according to claim 1, wherein the bus microcontroller is a control area network (CAN) bus microcontroller.

3. The bus microcontroller according to claim 1, wherein the means for placing at least part of the processor circuit into a reduced-power operating mode includes a means for determining which parts of the processor circuit are placed into the reduced-power operating mode.

4. The bus microcontroller according to claim 1, wherein the means for placing at least part of the processor circuit into a reduced-power operating mode are configured to permit at least a second part of the processor circuit to perform a task while at least a first part of the processor circuit is placed into the reduced-power operating mode.

5. The bus microcontroller according to claim 4, wherein the second part of the processor circuit is configured to cyclically monitor user-operated switch contacts of a circuit coupled to the bus microcontroller.

6. The bus microcontroller according to claim 4, wherein the second part of the processor circuit is configured to perform a task while a processor core of the processor circuit is in the reduced-power operating mode and not participating in performing the task.

7. The bus microcontroller according to claim 4, wherein the bus microcontroller is configured, when the at least part of the processor circuit is in the reduced-power operating mode, to identify itself as an inactive bus participant towards a bus control module from which the transmitter-receiver circuit receives bus messages.

8. The bus microcontroller according claim 1, wherein the bus microcontroller is configured, when the at least part of the processor circuit is in the reduced-power operating mode, to be placed into a plurality of different activation modes triggered by different activation bus messages, wherein information to activate the at least part of the processor circuit corresponds to one of the plurality of different activation modes, and wherein the activation control signal output by the power control circuit is one of a plurality of activation control signals.

9. The bus microcontroller according to claim 1, wherein the bus microcontroller is configured, when the at least part of the processor circuit is in the reduced-power operating mode, to operate with full functionality and an operating voltage applied thereto that is also applied in normal operation when the at least part of the processor circuit is not in the reduced-power operating mode.

10. The bus microcontroller according to claim 1, wherein the at least part of the processor circuit placed into the reduced-power operating mode performs a task in normal operation of the bus microcontroller when the bus microcontroller identifies itself as an active bus participant towards a bus control module from which the transmitter-receiver circuit receives bus messages.

11. The bus microcontroller according to claim 1, wherein the power control circuit is configured to analyze bus messages without participation of the processor circuit.

12. The bus microcontroller according to claim 1, wherein the bus microcontroller is formed as part of a vehicle electronic control unit.

13. A bus node circuit for a communication bus, comprising:
   a bus microcontroller having a processor circuit, the processor circuit having at least one unit adapted to perform one or more functions directed by a bus command passed over a communication bus;
   a transmitter-receiver circuit to receive bus messages, the transmitter-receiver circuit coupleable to the communication bus;
   a power control circuit coupled to the transmitter-receiver circuit;
   means for placing at least part of the processor circuit into a reduced-power operating mode without placing the entire processor circuit into the reduced-power operating mode, the power control circuit configured to evaluate incoming bus messages, the power control circuit configured to determine if an activation bus message contains information to activate the at least part of the processor circuit, and the power control circuit configured to output an activation control signal corresponding to the information to activate the at least part of the processor circuit; and
   means for activating the at least a part of the processor circuit from the reduced-power operating mode in response to output of the activation control signal of the power control circuit, wherein the bus microcontroller is configured, when the at least part of the processor circuit is in the reduced-power operating mode, to identify itself as an inactive bus participant towards a bus control module from which the transmitter-receiver circuit receives bus messages.

14. The bus node circuit according to claim 13, wherein the transmitter-receiver circuit is coupleable to a communication bus of a vehicle.

15. The bus node circuit according to claim 13, wherein the power control circuit is included in the transmitter-receiver circuit or the power control circuit is included in the bus microcontroller.

16. The bus node circuit according to claim 13, wherein the bus node circuit is formed as part of a vehicle electronic control unit.

17. A method, comprising:
   receiving a plurality of bus messages via a communication bus;
   evaluating bus messages;
   performing at least one function with a processor circuit, the performance of the at least one function directed by a bus command included in a first bus message of the plurality of bus messages;
   placing at least part of the processor circuit into a reduced-power operating mode without placing the entire processor circuit into the reduced-power operating mode;
   communicating an inactive-status bus message on the communication bus concurrent with the at least part of the processor circuit being in the reduced-power operating mode;
   determining if an activation bus message contains information to activate the at least part of the processor circuit;
   outputting an activation control signal corresponding to the information to activate the at least part of the processor circuit; and activating the at least part of the processor circuit from the reduced-power operating mode in response to the activation control signal.

18. The method according to claim 17, wherein placing the at least part of the processor circuit into the reduced-power operating mode is directed by information in a deactivation bus message.

19. The method according to claim 17, wherein the communication bus is configured to pass bus messages that conform to a control area network (CAN) protocol.

20. The method according to claim 17, comprising:
monitoring, with a second part of the processor circuit, at least one user-operated switch contact while the at least part of the processor circuit is in the reduced-power operating mode.

21. The method according to claim 17, wherein determining if the activation bus message contains information to activate the at least part of the processor circuit includes applying a mask to at least a portion of the activation bus message.

* * * * *